Dec. 9, 1941.  R. E. PARIS  2,265,445
RECORD CONTROLLED MACHINE
Filed Feb. 3, 1939  8 Sheets-Sheet 1
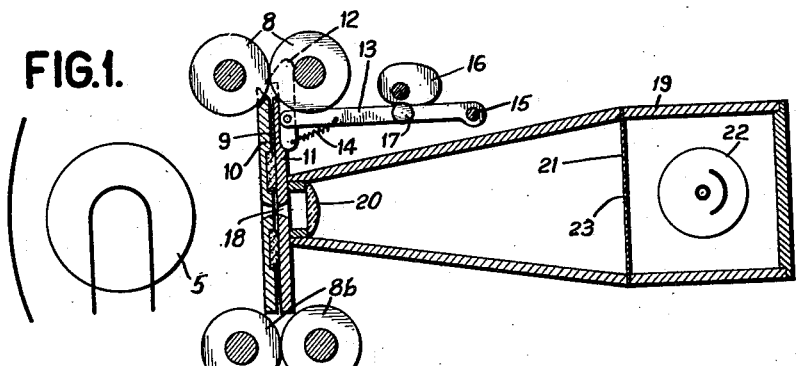
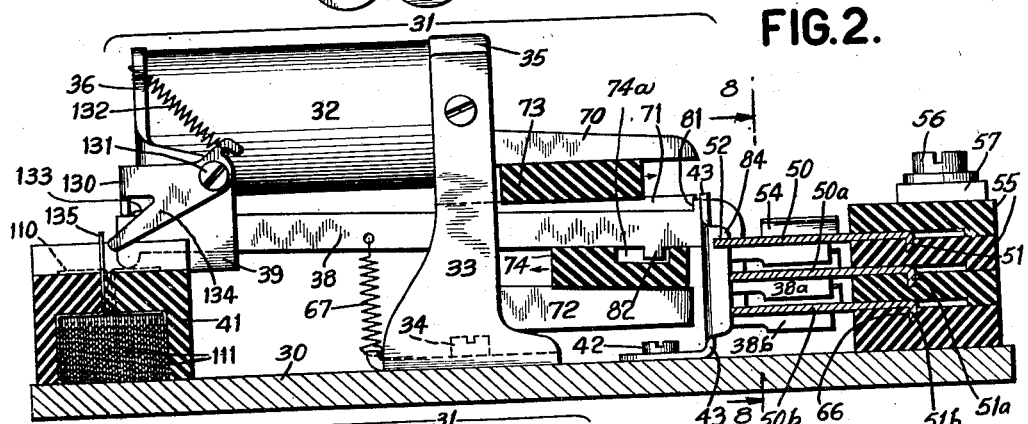
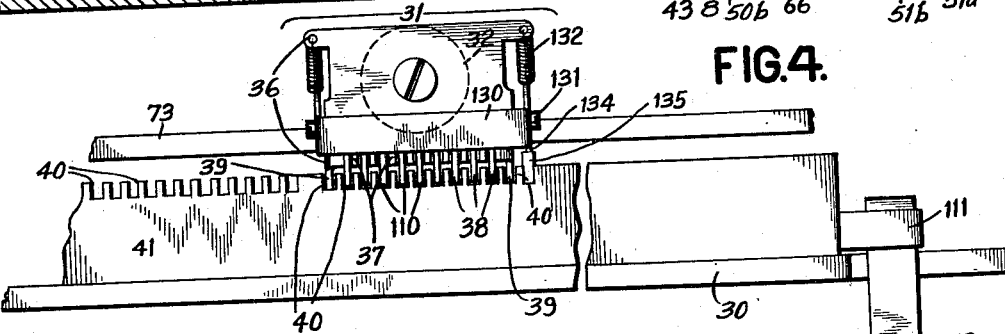
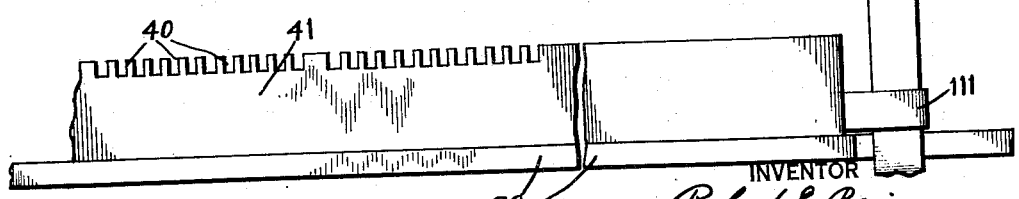
INVENTOR
Robert E. Paris
BY
-ATTORNEY Dec. 9, 1941.  R. E. PARIS  2,265,445
RECORD CONTROLLED MACHINE
Filed Feb. 3, 1939  8 Sheets-Sheet 2
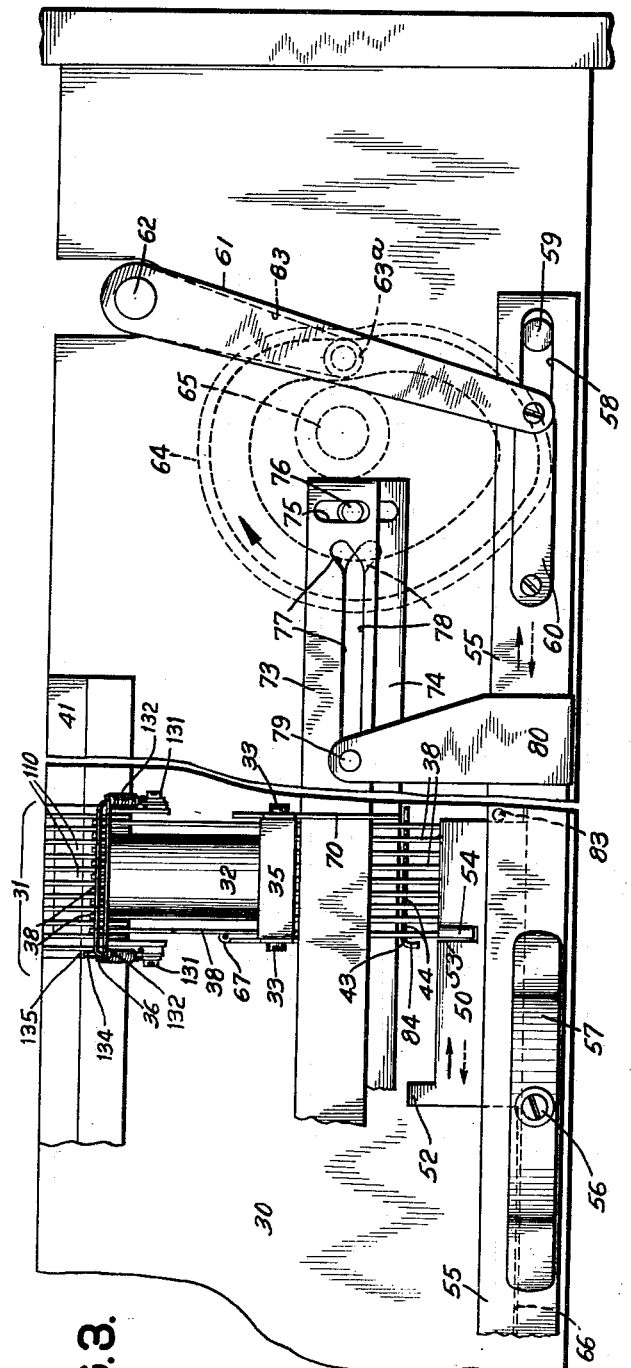
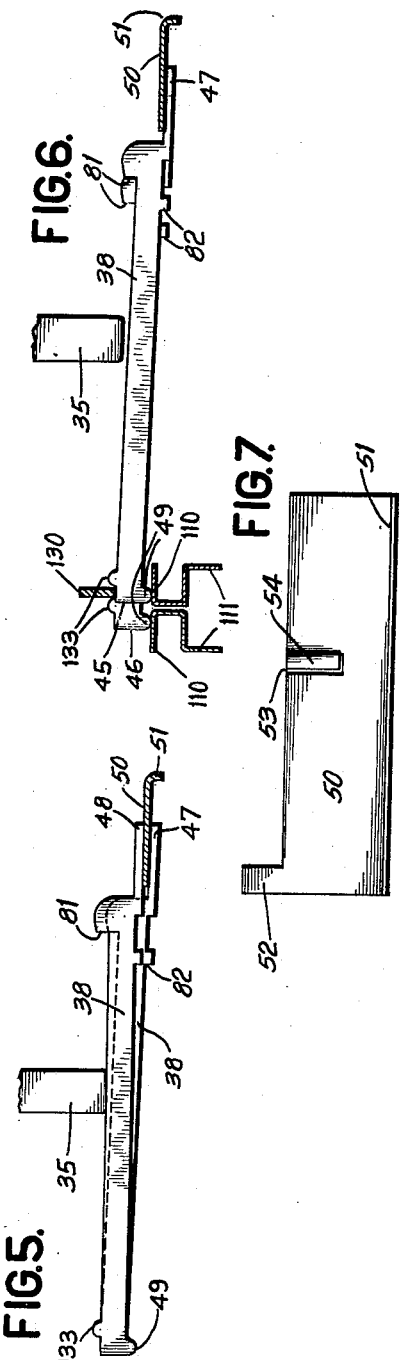
INVENTOR
Robert E. Paris
BY
ATTORNEY Dec. 9, 1941.   R. E. PARIS   2,265,445
RECORD CONTROLLED MACHINE
Filed Feb. 3, 1939   8 Sheets—Sheet 3
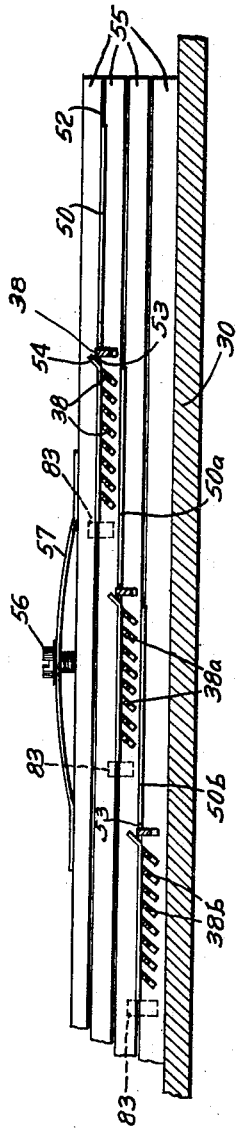
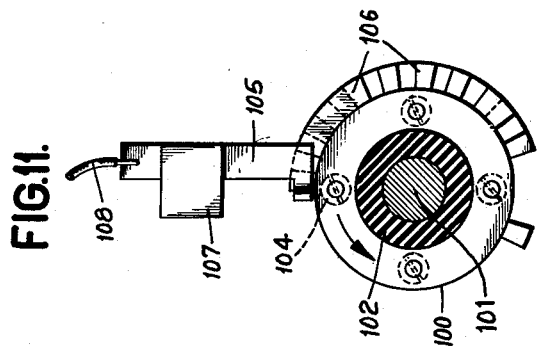
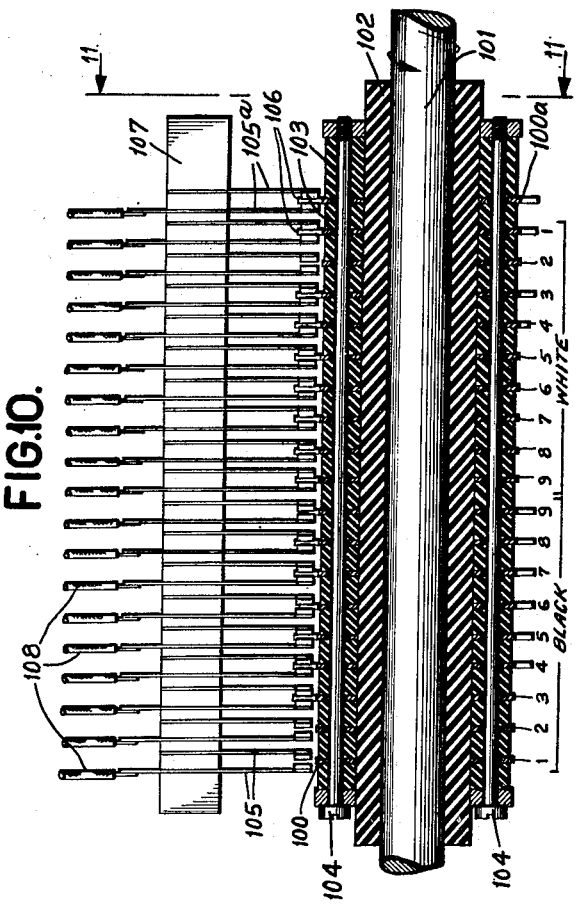
INVENTOR
Robert E. Paris
BY
ATTORNEY Dec. 9, 1941.   R. E. PARIS   2,265,445
RECORD CONTROLLED MACHINE
Filed Feb. 3, 1939   8 Sheets-Sheet 4

INVENTOR
Robert E. Paris
BY
ATTORNEY

Dec. 9, 1941.    R. E. PARIS    2,265,445
RECORD CONTROLLED MACHINE
Filed Feb. 3, 1939    8 Sheets-Sheet 5

FIG.13.

| POSITION | DIVISION 1 | | DIVISION 2 | | COMMON BLACK AND WHITE ZONES OF TWO DIVISIONS FOR EACH POSITION | | |
|---|---|---|---|---|---|---|---|
| | CHARACTER | ZONES # 1 2 3 4 5 6 7 8 9 | CHARACTER | ZONES # 1 2 3 4 5 6 7 8 9 | CHARACTER PAIRS | | ZONES # 1 2 3 4 5 6 7 8 9 |
| 1 | 1 | — ◯ — — — — — — — | M | — — — — — — — — ◯ | 1 M | — | — — — — — — — — |
| 2 | 2 | — ◯ ◯ ◯ ◯ — ◯ ◯ — | 6 | — — ◯ ◯ ◯ — ◯ ◯ — | 2 G | — | ◯ ◯ ◯ — ◯ ◯ — |
| 3 | 3 | — ◯ ◯ ◯ — ◯ ◯ ◯ — | E | — — ◯ ◯ — ◯ ◯ ◯ — | 3 E | — | ◯ ◯ — ◯ ◯ ◯ — |
| 4 | 4 | — ◯ ◯ ◯ ◯ ◯ — ◯ ◯ | P | — — ◯ ◯ ◯ ◯ — ◯ ◯ | 4 P | — | ◯ ◯ ◯ ◯ — ◯ ◯ |
| 5 | 5 | — ◯ ◯ — ◯ ◯ ◯ ◯ — | | | 5 | | ◯ — ◯ ◯ ◯ ◯ — |
| 6 | 6 | — ◯ ◯ ◯ ◯ — ◯ ◯ ◯ | F | — — ◯ ◯ ◯ — ◯ ◯ ◯ | 6 F | — | ◯ ◯ ◯ — ◯ ◯ ◯ |
| 7 | 7 | — ◯ ◯ ◯ ◯ ◯ ◯ ◯ ◯ | H | — — ◯ ◯ ◯ ◯ ◯ ◯ ◯ | 7 H | — | ◯ ◯ ◯ ◯ ◯ ◯ ◯ |
| 8 | 8 | — ◯ ◯ — — ◯ ◯ ◯ — | V | — — — — — ◯ ◯ ◯ ◯ | 8 V | — | — — ◯ ◯ ◯ ◯ |
| 9 | 9 | — ◯ ◯ ◯ — ◯ ◯ ◯ ◯ | R | — — ◯ ◯ — ◯ ◯ ◯ ◯ | 9 R | — | ◯ ◯ — ◯ ◯ ◯ ◯ |
| 10 | B | — ◯ ◯ — ◯ ◯ ◯ — — | I | — — — — ◯ — — — — | B I | — | — ◯ — — — |
| 11 | 0 | — ◯ ◯ ◯ ◯ ◯ — — | Z | — — ◯ ◯ ◯ ◯ — — | O Z | — | ◯ ◯ ◯ ◯ — — |
| 12 | Q | — ◯ ◯ ◯ ◯ — ◯ — — | T | — — — ◯ — — — — | Q T | — | ◯ — — — — |
| 13 | S | — ◯ ◯ — — ◯ ◯ — | W | — — ◯ — — — — — | S W | — | ◯ — — — — |
| 14 | A | — ◯ ◯ ◯ — — ◯ ◯ ◯ | Y | — — — — — — ◯ ◯ ◯ | A Y | — | — — ◯ ◯ ◯ |
| 15 | C | — ◯ ◯ ◯ ◯ ◯ ◯ ◯ — | D | — — ◯ ◯ ◯ ◯ ◯ ◯ — | C D | — | ◯ ◯ ◯ ◯ ◯ ◯ — |
| 16 | J | — ◯ ◯ — ◯ ◯ ◯ ◯ ◯ | N | — — ◯ — ◯ ◯ ◯ ◯ ◯ | J N | — | ◯ — ◯ ◯ ◯ ◯ ◯ |
| 17 | K | — ◯ — — ◯ ◯ ◯ ◯ ◯ | L | — — — — ◯ ◯ ◯ ◯ ◯ | K L | — | — — ◯ ◯ ◯ ◯ ◯ |
| 18 | X | — ◯ — ◯ ◯ ◯ ◯ ◯ ◯ | U | — — — ◯ ◯ ◯ ◯ ◯ ◯ | X U | — | — ◯ ◯ ◯ ◯ ◯ |

NOTE: DASHES — REPRESENT BLACK IN THOSE ZONES
CIRCLES ◯ REPRESENT WHITE AREA IN THOSE ZONES

INVENTOR
Robert E. Paris
BY
ATTORNEY

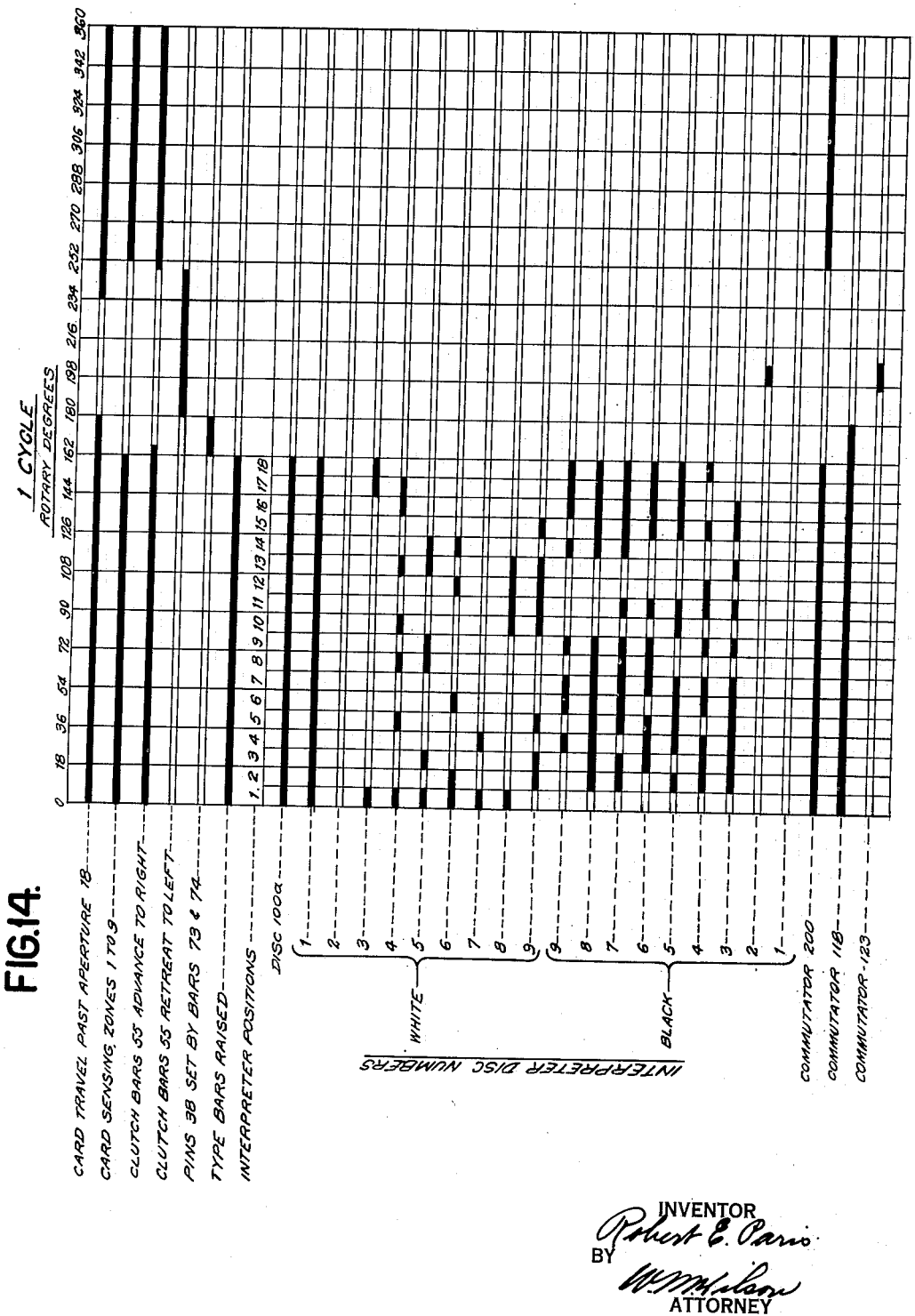

Dec. 9, 1941.   R. E. PARIS   2,265,445
RECORD CONTROLLED MACHINE
Filed Feb. 3, 1939   8 Sheets-Sheet 7
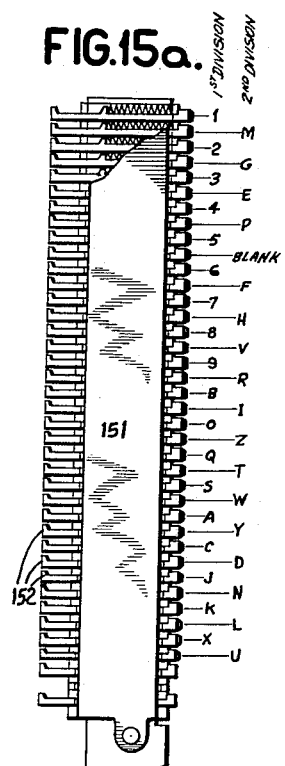
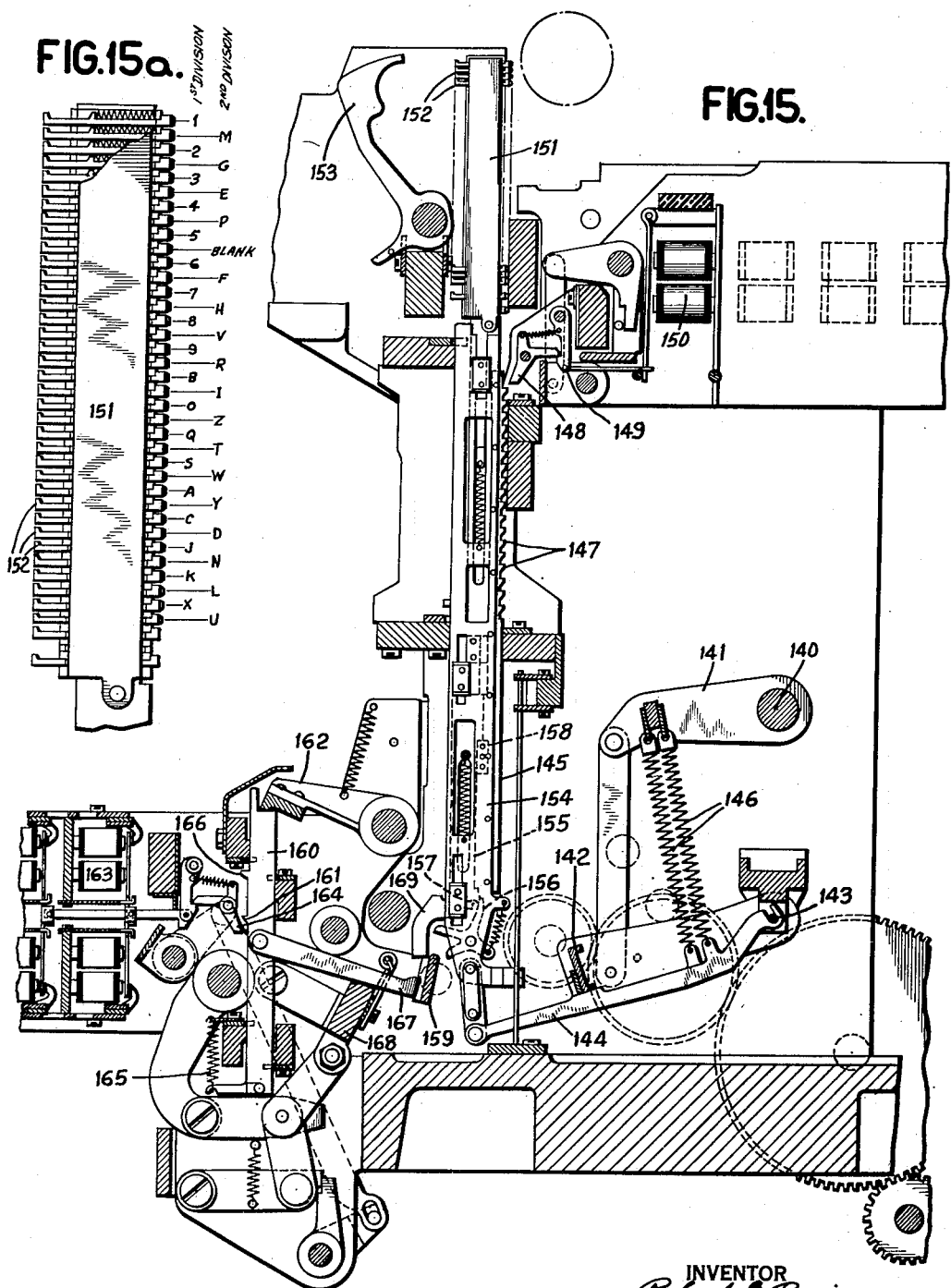
INVENTOR
Robert E. Paris
BY
W. M. Wilson
ATTORNEY

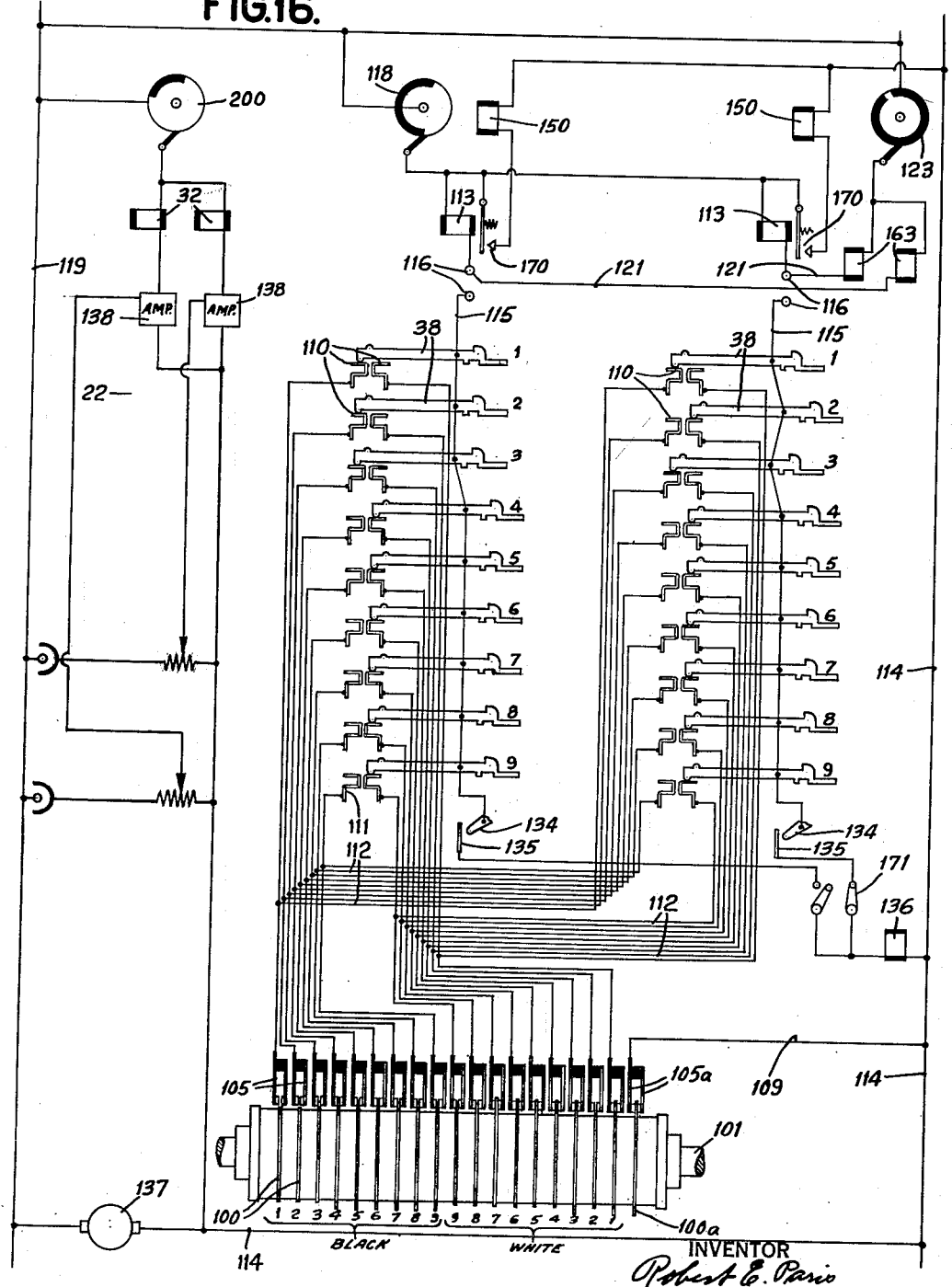

Patented Dec. 9, 1941

2,265,445

UNITED STATES PATENT OFFICE 2,265,445

RECORD CONTROLLED MACHINE

Robert E. Paris, New York, N. Y., assignor to International Business Machines Corporation, New York, N. Y., a corporation of New York Application February 3, 1939, Serial No. 254,423

16 Claims. (Cl. 101—93)

This invention relates to devices for reading characters carried by a record sheet or card and more particularly to devices for reading graphical characters and controlling operation of a statistical or accounting machine according to the meaning of the characters.

Reading of recorded characters and translation thereof into electrical impulses or mechanical movements for controlling a machine has been previously accomplished in several ways. Many of these have used a source of light and a comparing member for affecting photo-electric cells selectively in accordance with the value of the characters read. Others have provided a series of light sensitive cells positioned to be covered in various combinations by the characters. However, it appears that all of these methods required accurate placement of the characters on the record which rendered the use of a typewriter or similar recording machine commercially impractical, it being a well-known fact that such printing devices sometimes print the characters slightly out of position, either horizontally or vertically, with respect to the sheet.

The present invention proposes to overcome the aforementioned difficulty by providing a reading device which will read the characters correctly regardless of irregularity in the horizontal or vertical disposition of the characters. Of course irregularity in disposition is not intended to include complete displacement of the character from its allotted position but it is intended to describe the condition present when the usual printing means such as a typewriter is employed to print the record. However, the present device does permit considerable latitude in the placement of characters on the record sheet.

In the preferred embodiment of the invention, a light source is provided to cooperate with the record sheet or card to effect activation of a light sensitive cell. Each character is divided into zones with each zone being capable of controlling cell activation, and the record card is fed in such a manner as to effect control by successive zones of a character. Now each zone of a character is arranged to either prevent or permit cell activation in conformity with a code set up to differentiate between different characters. Code storage means are provided and means responsive to cell activation cooperate with a selector, which is operated in timed relation to the feeding means, to set said storage means. An interpreter is associated with the storage means and with the machine to be controlled and acts to translate the setting of the storage means into an energization of a machine controlling work circuit, the energization being timed with respect to the machine cycle according to the meaning of the character read. For purposes of illustration, the reading device is shown and described as adapted for use with a well-known tabulator machine.

In order to enable control of cell activation by a single zone, means are provided to limit the size of the light beam transmissible to the cell to a comparatively small spot or ray. Then the characters are fed so as to be progressively scanned by that ray of light along a vertical line with the scanning areas of the zones normally extending on each side of the scanning line. Consequently, the ray will fall within the zones of a character even though that character is horizontally displaced.

The characters on the record card may be legible variations of conventional shapes with the character lines covering those zones which are to prevent cell activation and not covering the remaining zones. In other words each of the characters may be said to include one or more index marks positioned along the line of scanning to effect interruption of cell activation at certain times in conformity with a code.

Means are provided which tend to operate the selector in timed relation to the feeding means. However, a latch is also provided which acts to prevent operation of the selector until the first interruption of cell activation by each character. As a result the setting of the storage means will be made according to the time of the interruptions with respect to the first interruption by each character. It is then obvious that the character will be read correctly even though it is irregularly disposed vertically.

In order to render the use of the device more desirable, the characters are preferably to be formed with the index marks contained within the outline of the characters, whereby the printed record will be pleasing to the eye and free from any hint of code to the reader.

It is, therefore, an object of the present invention to provide a device for reading characters carried by a record sheet in which means are employed to effect optical scanning of each character progressively, each of the characters having one or more index marks positioned along the line of scanning for influencing the scanning means at certain times in conformity with a code, and in which means responsive to said scanning means are included to effect operation of a statistical machine in accordance with the meaning of the character scanned.

It is also an object of the present invention to provide a device for reading characters carried by a record sheet in which a ray of light is employed to scan each character progressively to activate a light sensitive cell under the control of successive zones of a character, with those zones being individually arranged to either prevent or permit cell activation in conformity with a code, and storage means are provided as well as means operatively associated with the cell for selectively setting the storage means.

Another object is to provide novel selecting mechanism wherein mechanical elements corresponding to the respective elements of code comprising the code value designation of a character, are sorted in accordance with the particular permutation representative of the character.

It is another object of the invention to provide such a reading device in which an interpreter is provided to translate the setting of the storage means into an energization of a machine controlling circuit, the energization being timed with respect to the machine cycle according to the value of the character read.

A further object is to provide a character bearing control sheet for use with a reading device having a beam of light arranged to progressively scan a narrow vertical strip of each character, the controlling zones of the character having their scanning areas normally extending on each side of said strip, whereby the character will be read correctly even though it may be horizontally displaced, said areas being completely contained within the outline of the character.

Another object of the invention is the provision of a reading device for characters, each of which has one or more index marks positioned along the scanning line for interrupting cell activation at various times in conformity with a code, in which the means for setting the storage means according to the relative time of the interruptions is rendered inoperative until the first interruption during the optical scanning of each character.

Further objects of the instant invention reside in any novel feature of construction or operation or novel combination of parts present in the embodiment of the invention described and shown in the accompanying drawings.

In the drawings:

Fig. 1 is a diagrammatic view of the scanning means.

Fig. 2 is a partial section in side elevation of the storage device as associated with the selector.

Fig. 3 is a plan view of the storage device and selector.

Fig. 4 is an end view of the storage device.

Figs. 5 and 6 are details showing parts of the storage device.

Fig. 7 is a detail plan view of the selector plate.

Fig. 8 is a sectional view of the selector mechanism taken on line 8—8 of Fig. 1.

Fig. 9 is a detail of the contact strip of the storage device.

Fig. 10 is a section of the interpreter.

Fig. 11 is a view along line 11—11 of Fig. 10.

Fig. 13 is a code table.

Fig. 14 is a time chart.

Fig. 15 is a view of a tabulating mechanism.

Fig. 15a is a detail of the type head of the tabulator.

Fig. 16 is a wiring diagram including one form of well known photo-electric cell controlled, amplifier.

Coded characters

Figure 12:
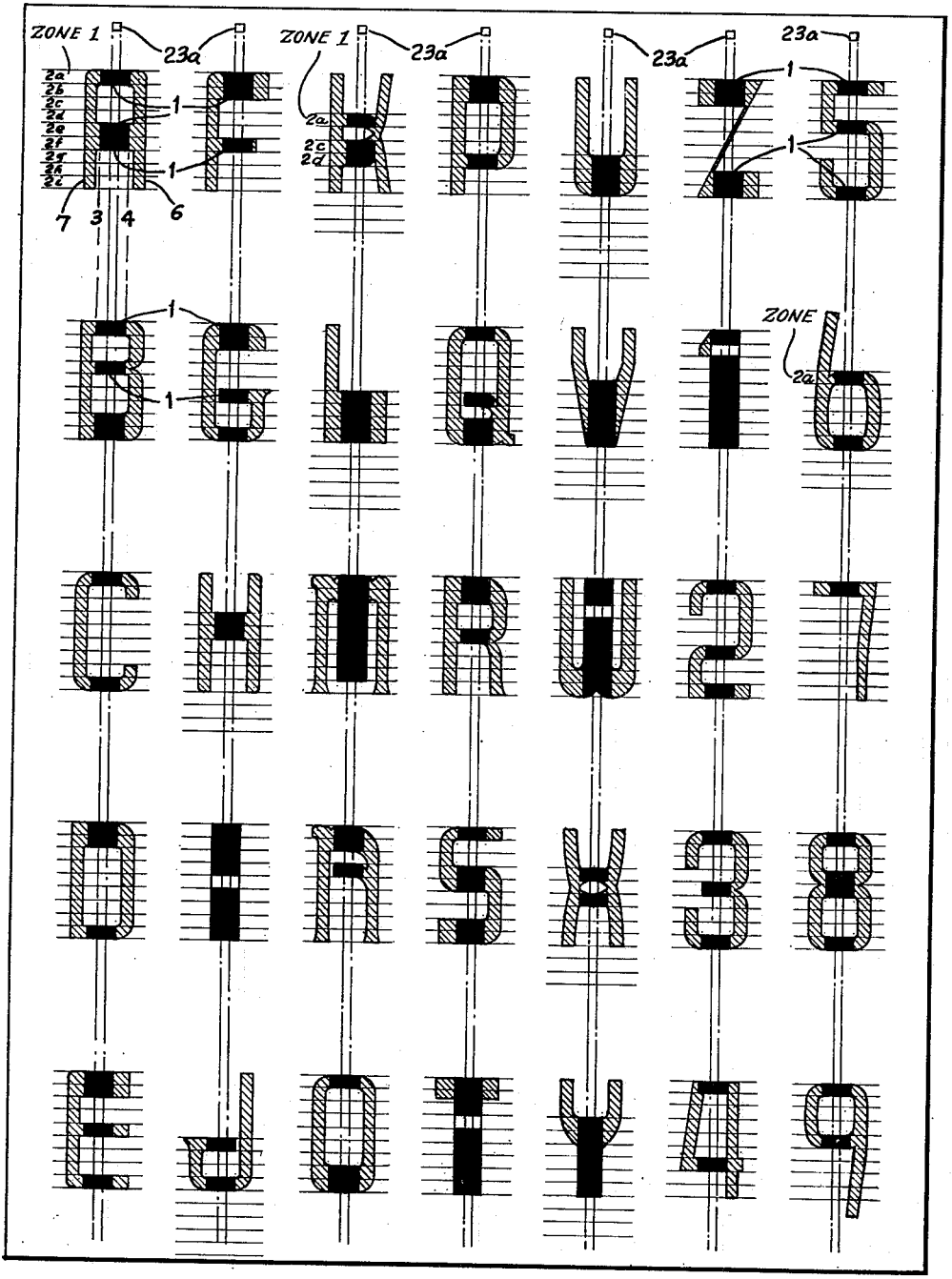
Fig. 12 shows the configuration of suitable characters.

As previously pointed out the present reading device is for use with coded characters on a record medium such as a card or control sheet, as disclosed in applicant's copending application Serial No. 278,469, filed June 10, 1939. The code, as illustrated in exaggerated manner in Figure 12 in order to simplify description, consists of combinations of horizontal dashes or index marks 1, placed one above the other for each character it is desired to represent. The dashes or marks are incorporated into the configuration of the characters and actually become the horizontal strokes occupying the vertical middle of each character. It is to be particularly noted that all characters comprising a complete alphabet as well as numerals of a complete digit notation are produced by the code, the code marks or elements being all completely within the contours of the respective characters. These dashes may be formed as perforations, series of punctures, embossings or ink printings which may be sensed by photo-electric or other methods. The following disclosure will illustrate photo-electric sensing of coded characters as one manner of producing such sensing.

In considering the application of the code to the letter A, for example, the height of this letter is divided into horizontal zones, 2—$a, b, c, d, e, f, g, h, i$; nine are shown but more or less may be used. The index marks or dashes will occupy certain of these zones from top to bottom thereby changing the light tonal quality of the occupied zone and extend the width of the sensing area from 3 to 4. The code for the letter A consists of a single dash, 1, occupying zone 2$a$, and forming the upper horizontal stroke of the letter, a dash in zone 2$e$ and a dash in zone 2$f$. These two, 2$e$ and 2$f$, merge into one dash two zones in height and not less in width than from 3 to 4, and form the middle cross bar of the letter A. and form the rest of the configuration of the letter, the upright strokes 6 and 7, are added and the result is a character which, although actually containing an arbitrary code of dashes, appears to the eye as a normal, legible letter A, the code blending inconspicuously with the outline of the letter. The dashes do not have to be of a perfectly rectangular shape so long as they occupy enough of the sensing area to affect the sensing means. Character K consists of a single dash occupying zone 2$a$ and a pair of consecutive dashes occupying zones 2$c$ and 2$d$, as seen in Fig. 12. The remaining characters are as shown.

The code illustrated in Fig. 12 is self-contained; that is, a group of dashes representing a character is not fixedly related to the edge of a card or a roll of paper. The first code dash, counting from the top part of a character actually first scanned, is not only part of the combinational code but is also a start signal to the mechanism for setting the storage device, so that a line of typing may be displaced vertically and still be accurately sensed. In addition, the width of the sensing area 3—4 will allow considerable horizontal displacement without affecting sensing, as will be pointed out hereinafter.

Card feed

Upper feed rollers 8, Fig. 1 may be actuated by the driving means of the tabulator to be described and are adapted to receive from a magazine a card, which is transparent when opaque index cards are used, and advance it at high speed into the card chamber 9 formed by plates 10 and 11 where the card is frictionally held by the plates. These plates are slightly longer and wider than the card and are secured at each end to the frame of the machine. A hooked member 12 is pivoted to lever 13 and inclined by spring 14 to engage the upper edge of a card held in the chamber. Lever 13 is fastened to a rod 15 which is mounted in bearings at its two ends. Two such hooks and levers are provided, each fastened to rod 15, and they are reciprocated vertically by cam 16 and roller 17 on one arm 13. Cam 16 is also operated by the driving means of the tabulator to reciprocate arms 13 once per tabulator cycle. They may reciprocate once per line of typing if more than one line is to be sensed on one card and several hooks may be used; or one of the well-known variable feeds may be used. As shown, the hooks feed the card at sensing speed past the sensing aperture until the character is completely sensed whereupon the card engages lower rollers 8b which serve to eject the card at high speed.

Sensing means

As soon as upper rollers 8 release their grip, the card is advanced by the hooks 12 so that a line of typing passes at sensing speed past apertures 18, which are slots in plates 10 and 11, corresponding in length to the line of typing to be sensed, and in width either to the height of a character or the thickness of a code dash as desired.

A light proof enclosure, 19, with a non-reflecting interior, contains a cylindrical lens 20, a diaphragm 21 and a photo-electric cell 22. Diaphragm 21 has an aperture 23 in width and length sufficient to permit passage of enough light from source 5 through the transparent card to affect cell 22 but small enough to limit the amount of light transmissible to the cell to a ray which may be entirely covered by the projected dark area of an index mark. One photo-electric cell, with individual light shielding is provided for each vertical column of characters. The cells may be staggered and the light rays may be diverged correspondingly by the angular setting of lens 20. A suitable size of ray relative to the zones and sensing area is shown at 23a in Fig. 12 and illustrates the latitude of horizontal displacement allowable.

Storage device

A novel storage device comprises a flat sheet of insulating material, 30, Figs. 2, 3, and 4, is to be secured at each end to the frames of the machine. Sheet 30 acts as a shelf upon which are mounted, side by side, a number of storage devices, indicated generally as 31. If more than one support 30 is required, the supports are placed one above another as in Fig. 4. One storage device is required for each vertical column of characters and may be permanently connected to its controlling photo-electric cell. A storage device consists essentially of a group of pins 38, one pin for each dash in the code; (nine in this case to correspond to the nine zone code) and a magnet 32 controlled by its related photo-cell to set the pins in accordance with the code. One magnet 32 for each storage device is supported horizontally by a rectangular U-shaped bracket 33 of non-magnetic material. The cross piece of the U is secured to base board 30 by a screw 34, Fig. 2. Secured between the upstanding arms of the U is a soft iron pole piece 35, rectangular in shape and fastened to the right end of the magnet core. Fastened to the left end of the magnet core is another, thinner, soft iron pole piece 36 in the lower, horizontal edge of which are cut nine vertical notches 37, Fig. 4, which act as guides for the pins 38. Pole piece 36 has two legs 39 which bear in two of notches 40 in insulated cross-piece 41. Nine other notches, 40, in each group coincide with notches 37 to form bearings for pins 38.

Secured at 42 to the base 30 for each storage device is a member 43 (Fig. 3) of non-magnetic material having nine notches 44 in its upper horizontal edge spaced to correspond to the nine notches in pole piece 36. Notches 37 and 40 in elements 36 and 41 and 44 in member 43, form bearings in which pins 38 may slide freely. The nine pins 38 correspond to the nine zones of the code. The pin seen as the first in Fig. 2, as the left hand one in Fig. 3, and as the right hand one in Fig. 4 is the first pin. The others follow in numerical sequence.

The pins 38 have two motions: first, a horizontal endwise motion from left to right in Figs. 2 and 6, and second, a slight rotary or oscillatory motion (Fig. 5). A pin when moved endwise to the right hand position, as shown at 45 in Fig. 6 indicates a white or transparent area in the zone which it represents for the character sensed; a pin moved to the left hand position 46 indicates a black or opaque area. The right hand ends of the pins 38 may move also in a slight arc from a lower position 47, Fig. 5, to an upper position, 48, bearing as a center upon rounded lug 49 at the left hand end of each pin.

The pins 38 are pulled upwards from their lower position by the magnetic attraction of pole piece 35 when magnet 32 is activated by its photo-cell 22 under influence of a white or transparent area in the record being sensed. The pins are restored to their lower position by mechanical means hereinafter described. The pins may be stampings, case hardened at wearing points, and might have a soft iron saddle to cooperate with pole piece 35.

The amount of the vertical travel of the right hand ends of pins 38 (Figs. 2 and 5) is just enough to place those ends either immediately above or immediately below a flat, horizontally disposed plate 50 which may be termed a selector plate. Each storage device has one selector plate 50 and as previously stated, the storage devices on one base 30 are set side by side. Plate 50 is about twice as long (Fig. 3) as one storage device is wide; therefore it is convenient to stagger the selector plates vertically. In Fig. 2, the selector plate cooperating with the first seen device is numbered 50. The plate cooperating with the next removed device is numbered 50a, and the third is numbered 50b. As seen in Fig. 8 they are staggered in three levels, the fourth removed being on the same level as the first. The right ends of pins 38 are extended to bring them to the level of their associated selector plates as shown at 38a and 38b, Fig. 2. Otherwise, all storage devices are identical.

Selector plates 50 act to synchronize the timing of the storage operation with record travel while the record is being sensed. They act also as means for resetting the right ends (Figs. 2 and 5) of pins 38 to their lower position. Plate 50 is a thin stamping of the general outline shown in Fig. 7 with its straight edge bent downwardly into a lip 51 extending along its length. The selector plates are slidably mounted and frictionally held between four flat insulated bars 55 resiliently secured as a group by screws 56 and spring 57, Figs. 2, 3 and 8. Bars 55, which move from left to right in Fig. 3 a distance about twice the width of the group of pins 38 for each storage device, may be termed clutch bars, because they serve as a friction clutch to pick up and move selector plates 50 when the latter are released.

Clutch bars 55 extend the length of the plate 30 and support the selector plates 50 for all the storage devices on that plate. Each group of clutch bars has a slot and pin mounting, 58 and 59 at each end of the group, pin 59 being fixed to base 30. By means of link 60 and arm 61, the group of clutch bars 55 is reciprocably connected with a vertically disposed rock shaft 62. Rock shaft 62, which is common to all groups of clutch bars, is rocked by means of an arm 63 and roller 63a, and a box cam 64 located below base plate 30. Cam 64 is secured to shaft 65 which makes, in synchronism with sensing, one revolution per tabulator sensing cycle. The downwardly bent lip 51 of each selector plate 50, slides in a groove 66, Figs. 2 and 3, running the length of its associated clutch bar 55 with the groove acting as a guide for the selector plate. Pressure exerted by springs 57 cause a resilient friction grip of selector plates 50 by clutch bars 55.

The first pin 38 of each device acts as a latch (Fig. 8) to prevent its selector plate from advancing in the direction of the full line arrow with the clutch bars. The tail or right hand end of the first pin is straight and broader than the others so that, when the pins are raised by magnet 32, it may enter a notch 53, Fig. 8 in selector plate 50, but, unlike the other pins, it cannot pass entirely through the notch 53 to a position above the plate. During the sensing cycle, as long as the record presents a transparent area to the photo cell, magnet 32 will tend to raise pins 38, and the first pin, fitting into and remaining in notch 53, will keep the selector plate from moving. However, the first black area presented by the record will cause the release of all the pins by magnet 32. The first pin will then drop from slot 53 and selector plate 50 will be instantly released to travel with its clutch bar. The drop of the first pin is assisted by a spring 67, Figs. 2 and 3. Consequently the first pin might be considered as a latch as well as part of the code storage means.

After a selector plate has been released by the drop of the first pin, and it is picked up and carried by the clutch bars, its notch 53 will pass the pins in regular order from 2 to 9 in timed relation to the rate of travel of the record. The notch will be over the second pin while the second zone 2b, Fig. 12 is presented for sensing at aperture 18, Fig. 1; over the third pin during sensing of the third zone; and similarly for the remaining zones. Only one pin at a time may pass through the notch, the others being kept in place, either up or down, by the solid portions of the selector plate to the right and left of the notch. If magnet 32 is attracting all nine pins, only that one pin immediately below the notch will be permitted to rise above the plate. If the magnet is not activated, due to the presence of a black area in the zone being sensed, a pin, of course, cannot rise and it remains under its selector plate. After the notch 53 has passed the ninth pin, those pins representing black areas in the code will be below the plate and those pins representing transparent areas will be above. This selection sets the pins for their endwise movement.

The right leg of U-shaped bracket 33, Fig. 3 (the further one in Fig. 2), is formed with three projecting arms 70, 71, and 72. These arms act as bearing surfaces for the upper and lower setting bars 73 and 74, respectively, common to all the storage devices in each horizontal row. At each end of a pair of setting bars is a slot and pin mounting, 75 and 76, Fig. 3, permitting a broadside motion of the bars, pins 76 being secured to base 30. At the ends of the upper and lower setting bars are longitudinal slots 77, 78 respectively, cam shaped at their extremities. Sliding in the slots 77, 78 is a pin 79 fixed to a support 80 which is secured to, and travels with, the group of clutch bars 55. Nearly at the end of the travel to the right of the clutch bars, the action of pin 79 in cam slots 77, 78 moves upper setting bar 73 to the right in Fig. 2 and moves lower setting bar 74 to the left as shown by the arrows. On the upper edge of each pin 38 is a shoulder 81 Fig. 5, which engages the edge of upper setting bar 73 when pin 38 is raised above the selector plate 50. On the lower edge c' each pin 38 is a corresponding shoulder 82 which engages with an inner edge of lower setting bar 74 when pin 38 is in its lower position under the selector plate. The movement of the setting bars, which occurs immediately after sensing the ninth zone, pushes to the right in Fig. 2 all those pins, representing transparent areas in the character code just sensed, which have been raised above the selector plate 50; and it pushes to the left those pins, representing black areas in the code character just sensed, which have remained under the selector bar.

After each sensing cycle of the tabulator, all pins 38 of each storage device are reset to their lower position under selector plate 50 preparatory to selective storage upon sensing of the next character, without affecting their longitudinal position. In forming notch 53 in selector plates 50, there is provided a flap 54 bent upwardly at a 45 degree angle, Figs. 2, 3 and 7. Upon the return travel, to the left as indicated by the dashed line arrow in Fig. 3, of selector plate 50, flap 54 engages successively the pins 38 and returns them to their lower position through the notch 53. During this time, current is cut off from magnet 32 by a commutator 200, Fig. 16. It will be noted that, with the exception of the first pin which never rises above the selector plate, the ends of pins 38 are twisted to a 45 degree angle (Fig. 8) to facilitate their passage through the moving notch 53 and a stud 83 (Fig. 3) in the clutch bars for each selector plate insures its positive return. A finger 52 on each selector plate abutting upon the turned in edge, 84, Figs. 2 and 3, of its associated guide plate 43 limits its travel to the right, and abutting upon another turned in edge 84 of its left hand neighboring guide plate limits its travel to the left. The selector plate, by virtue of the cooperation of cams 133 on each pin with yoke 130, Figs. 2, 4 and 6, which is pivoted at 131 and biased by spring 132 against the upper edges of pins 38, may move the right hand ends of the pins vertically without disturbing their longitudinal setting. As is seen in Fig. 2, bar 73 is normally to the left of any of the shoulders 81 of pins 38, whether the pins are in the right or left hand position. Also bar 74 is provided with a groove 74a which allows sufficient play between the projections 82 and this groove, so that upon return of bar 74 to the right hand position or upon return of bar 73 to its left hand position, unintended endwise shifting of the pins is avoided.

The interpreter

The foregoing description explains how the longitudinal setting of the pins of each storage device represents the zones of the code, and how each device registers whether any zone is black or white. The interpreter translates this setting into any other desired code in timed relation to the tabulator for tabulator type bar control.

For the purpose of this disclosure, a code has been adopted, designating each of 26 letters and 9 numerals, as shown in Fig. 12, and in the table Fig. 13.

In the table, the first, single, vertical column gives the position number or order in which the characters in other columns are symbolized in the interpreter: i. e., 1 and M, are first, 0 and Z are eleventh, X and U are eighteenth, etc. Division 1, lists the codes of the characters whose code symbols do not include a dash, in No. 2 zone. Division 2 lists the codes of the characters whose code symbols do include a dash in No. 2 zone. There are also listed the black and white zones which are common to the characters of Divisions 1 and 2, for each position, there being a pair for each position, except position 5. As will be explained, the controlling difference between two characters of a pair is that one has a dash in the second zone and the other has not. The second zone of this code is used for what is called "zone control" in the usual tabulating machine but which shall here be called "division control" to avoid confusion with the code zones.

The interpreter, Figs. 10 and 11, is a rotary commutator consisting of 19 metal contact discs, 100, fixedly mounted on a shaft 101 making one timed revolution per tabulator cycle. The contact discs, while insulated from the supporting shaft 101 by bushing 102 and separated by spacers 103, are electrically interconnected by long screws 104. Each disc has projecting contacts 106 along its periphery in accordance with the system of Fig. 13 which wipe on stationary contactors 105 insulatedly mounted on a suitable support 107. One of the discs, 100a, wipes its contactors 105a throughout the interpreter cycle (see Fig. 14) for connection thereby to a power source. The remaining eighteen discs are divided in half to represent nine black discs and nine white ones and numbered to represent code zones.

The contacts 106 of different discs 100 are arranged to wipe their contactors 105 at certain definite times as disclosed in the time chart, Fig. 14. From the chart it may be seen that during translation the interpreter passes through eighteen definite positions to test successively for the eighteen character pairs shown in the table, Fig. 13. It will also be noted that in each position, the respective white discs whose number designation is the same as the respective zone of the common black dashes of the character pair of that position as listed in the table, are connected by their contacts 106 to their contactors 105. Similarly the respective black discs whose number designation is the same as the respective zone of the common white areas of the character pair of that position are connected by their contacts 106 to their contactors 105. The manner in which such connections enable translation of the setting of the storage device will be pointed out later.

Referring again to Figs. 2, 3 and 4, the insulated crosspiece 41, which may be called a contact holder, extends the length of base 30 and is common to all the storage devices mounted on the base. It consists of two longitudinal halves secured to each other and holding, between the halves, nineteen pairs of thin, metal stampings of the general shape shown in Fig. 9. Projecting fingers 110 form contacts, and part 111 of each stamping is used as a lead for its contacts 110 which are spaced one for each storage device in a row. The contact stampings in each holder are insulated from each other and so arranged that eighteen contacts 110 lie individually in the bottom of notches 40 in crosspiece 41, two contacts, for each pin 38, upon which contacts may respectively bear lug 49, Fig. 6. Therefore, a pin 38 is in electrical contact with either one or the other of its two associated contacts 110, and according to its position representing either a black or a white area in the code zones of the character last sensed, those to the left being black and those to the right being white. Cross strips 112, Fig. 4, are used to connect electrically, corresponding contact stampings 111 in all horizontal rows of storage devices.

The tabulator

For the purpose of illustrating how the reading device might be practically adapted for use in tabulating machines, it is disclosed herein as applied to the alphabetic printing mechanism of such a machine. This mechanism is of the type well-known in the art and described in the patent to Mills, No. 2,016,682, issued October 8, 1935. Consequently, a detailed description is not deemed necessary here and reference to the aforementioned patent may be made for a complete detailed description of the mechanism.

Referring now to Figs. 15 and 15a, shaft 140 carries arms 141 which have a depending link connection with a bail 142 pivoted at 143. Also pivoted at 143 are type carrier actuating arms 144 which are connected at their free ends to the lower extremity of type carriers 145, there being a type carrier 145 and arm 144 for each vertical column of characters to be printed. Then as arms 141 and bail 142 are rocked clockwise by cams (not shown), springs 146, interconnecting arms 141 and 144, will resiliently raise arms 144 to effect vertical movement of the corresponding type carrier 145. A series of eighteen stops 147, one for each interpreter position, is provided on type carrier 145 and the stops are moved upwardly past a stopping pawl 148 in succession with each stop being opposite the pawl as the corresponding interpreter position is reached. Pawl 148 is held away from the stops by a latch 149 which is released upon energization of magnet 150. A type head 151 is supported on the type carrier 145 and has a plurality of type elements 152 adapted to be individually actuated by hammer 153 to effect printing. The type elements are so arranged that every other element will be located in printing position as the stops 147 pass the pawl 148. Thus, as shown in Fig. 15a, if the character "1" type is in printing position as the first stop passes the pawl, the character "2" type instead of character "M," will be in printing position as the second stop passes the pawl. It will be observed that reading from top to bottom, the type elements are formed to print the first division character (Fig. 13) then the second division character of the first position; then the first and second division characters of the second position and so on through the eighteen positions.

The type carrier 145 includes two sections 154 and 155, the former being connected to the arms 144 and the latter being mounted resiliently on section 154 and arranged to carry the type head. These two sections are adapted to have two positions relative to each other; a lower or first division position and an upper or second division position. Whether the first or second division character will be printed, as the type carrier is halted at one of the eighteen positions, will depend upon the relative positions of the two sections of the type carrier relative to each other. A spring biased latch 156 cooperates with a step 157 on section 155 to hold the sections in the second division position, the parts being held in the first division position by stop 158 when the latch 156 is located away from step 157 as illustrated in Fig. 15.

As the type carrier descends after printing, a bail 159 is raised to engage an extension of latch 156 to effect positioning of the sections in the first division position. The bail 159 is then lowered and the mechanism is ready to test for division setting for the next character. As previously mentioned, the test for division setting relates to the presence or absence of an index mark in the second zone of a character. Now a comb 160 is provided with a stop 161 and during division testing is moved upwardly, under the control of cam-controlled bail 162, by springs 165. If an index mark is in the second character zone, magnet 163 will be energized to release spring biased pawl 164 to permit it to engage stop 161. If an index mark is not in the second zone, the comb 160 will continue to the position shown. As comb 160 is lowered by bail 162, the pawl is rotated into relatched position by tooth 166.

An arm 167 is pivoted on comb 160 and the location of that pivot relative to the type carrier depends upon whether or not the comb is stopped by the pawl 164. A bail 168 is moved upwardly a definite distance in turn move the free end of arm 167 upwardly to a point depending upon the position of its pivot. Then if magnet 163 has been energized, the free end of arm 167 will engage portion 169 of section 155 to raise that section with respect to section 154 and effect a second division setting of the type carrier. If the magnet has not been energized, the arm 167 will not change the first division setting.

*Operation*

The general operation of the device will be described in connection with Figs. 14 and 16.

If a machine cycle is considered as beginning as indicated by zero in Fig. 14, the storage devices have already been set by setting bars 73 and 74 in accordance with the sensing of a preceding character and the preliminary setting by magnet 32 and selector plate 50, the division control operated and the sensing of the next character is well under way. The tabulator motor 137 (Fig. 16) is connected between two main lines 114 and 119. The photo-cell 22 of each sensing unit is connected in a well known manner with the usual individual amplifier 138 and magnet 32, all of the combinations of photo-cell, amplifier and magnet being connected in parallel with each other (only two being shown) and in series with commutator 200.

As previously mentioned, the right hand ends of pins 38 may be raised during the sensing of the next character by the magnet 32 cooperating with the selector plate without disturbing their previous longitudinal setting as determined by the sensing of the preceding character. The group of pins at the right in Fig. 16 illustrate the relative settings of the individual pins for an "X" and the group at the left for a "U."

Before a particular setting of the pins is interpretively tested and immediately after any group of pins have been set by bars 73 and 74 the division control means must be actuated to determine which one of the selected pair of characters shall be printed. As is seen from Fig. 14, shortly after bars 73 and 74 have set the sorted pins, the black disc #2 makes contact, and if there be a black dash in the second zone of the character just sensed, so that the second zone pin contacts the left hand one of the pair of contacts 110 as in the left hand column of Fig. 16, a circuit will be completed from line 114 through black disc 2, left hand contact 110, pin 38 for the second zone, line 115, the plug connection between sockets 116, wire 121, magnet 163, commutator 123 which is energized only at the time that black disc 2 makes contact with its wipers 105, to line 119. Energization of the magnet 163 will set the division control as previously described, so that after interpretive testing is finished, the lower character on the type head, of the pair selected, will be printed.

As the interpreter arrives at the zero position (Fig. 14) to test for the "1—M" character pair, the white discs (see also the right hand column of Fig. 13) 1, 3, 4, 5, 6, 7 and 8 contact wipers 105. Since there are no common white areas in position 1 (Fig. 13) no black discs are connected to wipers 105 (see also Fig. 14). A circuit is then completed from line 114 through wire 109, wiper 105a, disc 100a, one of white discs 4, 5, 6, 7, or 8, a right hand contact 110, a corresponding pin 38, wire 115, the plug connection between sockets 116, magnet 113, commutator 118 to wire 119. Magnet 113 is energized so that contacts 170 are opened and the type head proceeds to the second position.

It will be evident that a circuit will always be completed during interpretive testing until the interpreter position is reached in which none of the live left or right hand contacts 110, which are connected to the black and white interpreter discs through wipers 105, will be contacted by a pin 38. Inspection of the time chart and the table (Fig. 13) will reveal that this condition will exist only at the interpreting position listed for the particular character setting of the storage device, which for the settings shown in Fig. 16 will be the 18th interpreter position. At this time, since only white discs 1 and 3 contact wipers 105 and since the right hand contacts 110 cooperating with the corresponding #1 and #3 pins are open and further since only black discs 4, 5, 6, 7, 8 and 9 contact wipers 105, the magnet 113 will be deenergized, closing contacts 170 to complete the circuit through magnet 150 of the tabulator. The type carrier will then be halted and the proper character printed upon subsequent release of the print hammer 153. If the group of pins at the right in Fig. 16 were interpreted, letter X would be printed. If the group of pins at the left in Fig. 16 were to be interpreted, since division control would have previously occurred, the letter U would now be printed.

As soon as the interpretive testing for any previous selection is ended, bars 73 and 74 longitudinally reset pins 38 according to the selection which was made during interpretive testing, and division control and interpretive testing will be performed for the new selection.

As is seen from inspection of Fig. 14, the card travel past the aperture itself, and the sensing of the zones actually begin after card ejection at 234 degrees when the next card is brought up to the position where sensing of the zones of the next character actually begins prior to the position designated as zero. Resetting of the bars, it is to be noted, is begun at the end of the first 180 degrees. Division control, preliminary to interpretive testing also ensues during the last 180 degrees of the preceding cycle.

In addition to the operation just described, means have been provided to effect energization of an automatic total control magnet 136 generally similar to magnet 161, Fig. 1 of the patent to J. W. Bryce, 1,763,033. If it is desired to take a total when the character of any one or more of the vertical columns is changed, it is only necessary to close the appropriate switch 171, Fig. 16. Mounted on yoke 130 is an arm 134 (Figs. 2 and 16) which, when raised, makes electrical connection with contact 135 completing a circuit from line 114 through magnet 136, switch 171, contacts 135—134, line 115, magnet 113, commutator 118 (see Fig. 14) to line 119. It is evident that when any one of pins 38 is shifted, the cam 133 (Fig. 6) will raise the yoke 130 to effect energization of the total control magnet. The type carrier is descending at this time and the momentary energization of magnet 113 will have no ill effects.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a reading device for a record sheet having graphic characters thereon, said characters comprising any of a complete set of alphabetic and numeric characters, each character including a legible outline having one or more portions of said outline forming index marks to completely selectively distinguish said characters, according to a combinational code, from all other characters of said complete set, said code designations being aligned in a single fictive straight line, means producing progressive sensing of said characters in a single straight line, said sensing means comprising means affected in one manner or an opposite manner in accordance with the presence or absence of said index marks, selector means controlled in accordance with the different permutative effects produced on said sensing means, and latching means comprising a part of said selector means, preventing operation of said selector means, and means simultaneously releasing said latching means upon sensing of a first code mark and initially controlling said selector means.

2. Selecting mechanism comprising a plurality of storage pins, means responsive to electrical impulses urging said pins into motion, a selector plate preventing said motion, means forming an opening in said plate, means urging said plate to move in step with said impulses to respectively align said pins and said opening, and means on one of said pins for entering said opening and preventing movemet of said plate upon movement of said pin.

3. Selecting mechanism comprising a plurality of storage pins, means responsive to electrical impulses urging said pins into motion, a selector plate preventing said motion, means urging said plate into motion, means forming an opening in said plate, means on one of said pins for entering said opening to prevent movement of said plate upon alignment of said pin and opening and urging of said pin, said pin emerging from said opening upon cessation of its urging pulse, and means on the others of said pins and movable freely through said opening upon respective alignment of said pins and opening, and urging of said pins.

4. Selecting mechanism comprising a plurality of storage devices and means for selectively positioning said devices in conformity with alternative electrical conditions comprising a selector, means for reciprocating said selector, means forming an opening in said selector, means effective upon moving of said selector in one direction for successively aligning said opening and said devices, respectively, means controlled by said electrical conditions and adapted to actuate said devices during said respective alignments, means on one of said devices adapted to enter said opening to stop said selector upon actuation of said device, means on the others of said devices and freely movable through said opening upon respective alignment and actuation of said devices to thereby locate said devices on one side of said selector, and means on said selector for returning said last devices to the other side of said selector upon reversal movement thereof.

5. Selecting mechanism comprising a plurality of storage devices and means for selectively positioning and arranging said devices in conformity with the characteristic of respective code elements each of whose permutations are representative of a quantity, comprising a selector, means forming an opening in said selector, means moving said selector for successively aligning said opening and said devices, respectively, means responsive to an electrical condition representative of code elements of one characteristic and adapted to actuate said devices during said respective alignments and occurrence of said condition, means on each of certain of said devices adapted to enter said opening and to pass therethrough upon alignment of and actuation of said aligned device to thereby locate said actuated devices on the opposite side of said selector from the unactuated devices in conformity with said occurrence of said electrical condition, and means for relatively moving the elements on one side of the selector with respect to the elements on the other side thereof.

6. A selecting mechanism comprising a plurality of pairs of electrical contacts, an electrical contactor for each of said pairs, means mounting said contactors for movement into engagement with either one of its respective pair of contacts and means for selectively moving each of said contactors into engagement with one of its corresponding pair of contacts comprising means operative by sequential electrical impulses for moving said contactors in one direction, means cooperating with moved contactors to hold said moved contactors in a set position, and means acting upon said set contactors only, for selectively moving each of them from engagement with one contact into engagement with the other of its corresponding pair.

7. A selecting mechanism comprising a plurality of pairs of electrical contacts, an electrical contactor for each of said pairs, means mounting said contactors for movement of corresponding portions thereof to either one of two chosen positions in one plane and for movement of said contactors to either one of two positions in another plane, means for selectively moving each of said contactors into engagement with one or the other of its corresponding pair of contacts comprising means controlled by sequential electrical impulses for positioning said contactors in one position in said one plane upon energization of said means and in another position in said one plane upon deenergization thereof, and means for moving the contactors in said one position simultaneously, in one direction, and in said other plane, to engage one of the corresponding pair of contacts and moving the contactors in the said other position in another direction in said other plane to engage the other of the corresponding pair of contacts.

8. A selecting mechanism comprising a plurality of pairs of electrical contacts, an electrical contactor for each of said pairs, means for selectively moving each of said contactors into engagement with one or the other of its corresponding pair of contacts comprising means controlled by sequential electrical conditions of one characteristic, to move said contactors, means movable in synchronism with the sequence of conditions to prevent movement of all but one contactor at any one time upon occurrence of said one characteristic condition, to thereby sort moved contactors from unmoved contactors, and means for transporting said moved contactors into engagement with one of the corresponding pair of contacts and the unmoved contactors into engagement with the other of the corresponding pair.

9. A selecting mechanism comprising a solenoid, a plurality of movable elements, said solenoid energized or deenergized periodically in accordance with the characteristics of an equal plurality of different electrical conditions comprising a particular permutation representative of a particular factor and applied sequentially to said solenoid, sorting means moving in step with the sequence of application of said electrical conditions and cooperating with said solenoid to position and retain said movable elements at one location or another, and means next operative to simultaneously and positively move said elements at one location to one position and said elements at the other location to an oppositely directed position whereby said elements are relatively positioned in a pattern indicative of the particular factor.

10. A selecting mechanism comprising a solenoid, a plurality of movable elements, said solenoid energized or deenergized periodically in accordance with the characteristics of an equal plurality of different electrical conditions comprising a particular permutation representative of a particular factor and sequentially applied to said solenoid, sorting means comprising a selector moving in step with the sequential application of said electrical conditions, means forming an opening in said selector aligned sequentially with each of said movable elements, each of said elements being thereby located on one side or the other side of said selector, a pair of contacts for each of said movable elements, and pusher means moving the elements on said one side of said selector into engagement with one of the respective pair of contacts and the elements on the said other side of said selector into engagement with the other of the respective pair to form a pattern of closed contacts indicative of the particular factor.

11. In a permutation code device, a solenoid conditioned in opposite manners dependent upon the characteristic of electrical conditions representative of code elements, a plurality of movable pins, one for each element of code, a pair of contacts for each of said pins, means mounting said pins for movement of translation and movement of oscillation, a selector, means forming an opening in said selector, means for moving said selector to align said opening sequentially with each of said pins upon occurrence of each condition representative of each element of code whereby upon occurrence of an electrical condition of one characteristic a pin is passed by oscillation through said opening to the opposite side of said selector and upon occurrence of an electrical condition of another characteristic no pin is so passed whereby the pins are sorted in accordance with the particular permutation of the electrical conditions, and a pair of pusher elements controlled by said selector moving means and each of said pair being movable in opposite directions respectively at a chosen point in the travel of said selector, one of said pusher elements translating the passed pins into engagement with one of the respective pair of contacts and the other of said pusher elements translating the unpassed pins into engagement with the other of the respective pair of contacts to form a pattern indicative of the particular permutation of code elements.

12. In a permutation code device, a solenoid, conditioned in different manners dependent upon the characteristics of electrical conditions representative of code elements, a plurality of movable pins, one for each element of code, a pair of contacts for each of said pins, means on each of said pins extending in one direction and means on each of said pins extending in the opposite direction, a selector, means forming an opening in said selector, means moving said selector to align said opening sequentially with said respective pins, said aligned pins being passed through said opening by said solenoid to the opposite side of said selector upon occurrence of an electrical condition of one characteristic and said pin remaining on the first side of said selector upon occurrence of an electrical condition of a different characteristic, and means controlled by said selector moving means and movable into contact respectively with both said extending means, said pins being translated in one direction by contact of said controlled means with said means extending in one direction and being translated in the opposite direction by contact with said means extending in the opposite direction.

13. A selecting device comprising a solenoid, a plurality of pins, a plate, means forming an opening in said plate, frictional means mounting said plate for reciprocal movement transversely of said pins to align said opening with said pins, respectively, means on one of said pins, movable into engagement with the sides of said opening upon a certain first type conditioning of said solenoid to lock said plate against the force of said frictional means and movable out of engagement upon the reverse conditioning of said solenoid to release said plate, and means on the others of said pins, adapted to pass through said opening from one side to the other of said plate, upon alignment of the respective pins and said opening and said first type conditioning of said solenoid, and to remain on said one side, upon the reverse conditioning of said solenoid, whereby said other pins are selectively located on opposite sides of said plate, and means on said plate cooperating with said passed pins to return the same through said opening to said one side upon reversal of the transverse movement of said plate.

14. A selecting device comprising a solenoid, a plurality of pins, a pair of cooperating contacts for each of said pins, a plate, means forming an opening in said plate, a pair of support bars, means resiliently frictionally mounting said plate between said bars, means for reciprocating said bars and thereby said plate under the stress of said applied friction whereby said plate opening is aligned respectively with said pins, a pair of pusher bars, a slot in each pusher bar, an offset formed in each slot and extending in opposite directions, respectively, means on said support bars engaging said slots to move said pusher bars transversely in opposite directions when said offsets are reached, means on one of said pins engaging the sides of said opening to lock said plate against movement upon alignment of said pin and opening and conditioning of said solenoid in one manner, said pin releasing said plate upon conditioning of said solenoid in the opposite manner, portions of each of said other pins movable through said opening upon alignment of said opening and pin and conditioning of said solenoid in said one manner only, whereby said pins are selectively positioned on opposite sides of said plate, said pusher bars cooperating with said passed and said unpassed pins, respectively to move the same in opposite directions in accordance with their position with respect to said plate to thereby move said pins into engagement with one or the other of the respective pair of cooperating contacts.

15. A selecting device comprising a solenoid, a plurality of pins, a plate, means forming an opening in said plate, a pair of supporting devices frictionally engaging said plate, means for reciprocating said devices in step with the energization of said solenoid whereby said plate opening is sequentially aligned with said pins, means on the first of said pins cooperating with said opening to lock said plate upon one type of conditioning of said solenoid, said pin releasing said plate upon a different type of conditioning of said solenoid, portions of each of the others of said pins movable through said opening upon said one type of conditioning only, of said solenoid and after release of said plate for reciprocation to sequentially align said opening and pins, respectively, whereby said pins are selectively sorted on opposite sides of said plate in accordance with the particular permutation of the sequence of the different types of energization received by said solenoid, a pair of pusher elements, and means controlled by said support devices for actuating said pusher elements in opposite directions after sorting of said pins is completed, one of said pusher elements cooperating with the pins on one side of said plate and the other of said elements with the pins on the other side of said plate to respectively position said pins in accordance with their sorted categories.

16. Selecting mechanism comprising a plurality of storage pins, means continuously mounting said pins for motion of translation, and for oscillation respectively about one end only thereof, means responsive to a sequence of electrical effects of alternative characteristics for oscillating certain of said pins in accordance with said sequence about said end only, the oscillated and unoscillated pins thereby arranged in accordance with the said characteristics, means for translating said oscillated and unoscillated pins endwise, whereby the endwise arrangement of pins corresponds to the above arrangement, and means for retaining said endwise arrangement during a subsequent oscillation of certain of said pins according to another sequence of electrical effects.

ROBERT E. PARIS.